United States Patent
Abotabl et al.

(10) Patent No.: US 11,895,685 B2
(45) Date of Patent: Feb. 6, 2024

(54) MODIFICATIONS TO CONFIGURED GRANTS AND SEMI-PERSISTENT SCHEDULING CONFIGURATIONS BASED ON TIME DOMAIN PATTERNS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 17/202,203

(22) Filed: Mar. 15, 2021

(65) Prior Publication Data

US 2022/0295513 A1    Sep. 15, 2022

(51) Int. Cl.
*H04W 72/12* (2023.01)
*H04W 72/04* (2023.01)
*H04W 72/50* (2023.01)
*H04W 72/0446* (2023.01)
*H04W 72/1273* (2023.01)
*H04W 72/23* (2023.01)

(52) U.S. Cl.
CPC ..... *H04W 72/535* (2023.01); *H04W 72/0446* (2013.01); *H04W 72/1273* (2013.01); *H04W 72/23* (2023.01)

(58) Field of Classification Search
CPC ........... H04W 72/0406; H04W 72/042; H04W 72/1284; H04W 76/27; H04W 72/1289; H04W 76/38; H04W 72/14; H04W 36/30; H04W 48/12; H04W 48/06
See application file for complete search history.

(56) References Cited

U.S. PATENT DOCUMENTS 10,841,943 B2    11/2020    Holfeld et al.
2014/0206375 A1*    7/2014    Ohta ..................... H04W 72/20
                                                        455/452.2

(Continued)

OTHER PUBLICATIONS

International Search Report and Written Opinion—PCT/US2022/070531—ISA/EPO—dated May 27, 2022.

*Primary Examiner* — Romani Ohri
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indication of at least one of a configured grant or a semi-persistent scheduling (SPS) configuration. The UE may transmit or receive, based at least in part on a modification to the at least one of the configured grant or the SPS configuration, wherein the modification is based at least in part on a change from a first time domain pattern to a second time domain pattern. The UE may receive and indication of the modification from the base station. Additionally, or alternatively, the UE may determine the medication based at least in part on at least one rule stored in a memory of the UE. Numerous other aspects are described.

30 Claims, 11 Drawing Sheets

(56) References Cited

U.S. PATENT DOCUMENTS

| | | | |
|---|---|---|---|
| 2016/0029392 A1* | 1/2016 | Hwang | H04W 72/042 |
| | | | 370/280 |
| 2016/0044708 A1* | 2/2016 | Lin | H04L 1/1854 |
| | | | 370/280 |
| 2016/0205683 A1* | 7/2016 | Quan | H04W 16/10 |
| | | | 370/280 |
| 2017/0289733 A1 | 10/2017 | Rajagopal et al. | |
| 2019/0104515 A1* | 4/2019 | Li | H04L 1/1861 |
| 2019/0132109 A1* | 5/2019 | Zhou | H04L 5/001 |
| 2019/0327760 A1* | 10/2019 | Holfeld | H04W 72/0446 |
| 2020/0351843 A1* | 11/2020 | Zhou | H04W 72/042 |
| 2020/0413424 A1 | 12/2020 | Fakoorian et al. | |
| 2021/0084677 A1* | 3/2021 | Wänstedt | H04W 4/06 |
| 2022/0149997 A1* | 5/2022 | Wang | H04L 1/1887 |
| 2022/0159682 A1* | 5/2022 | Liu | H04W 72/23 |

* cited by examiner

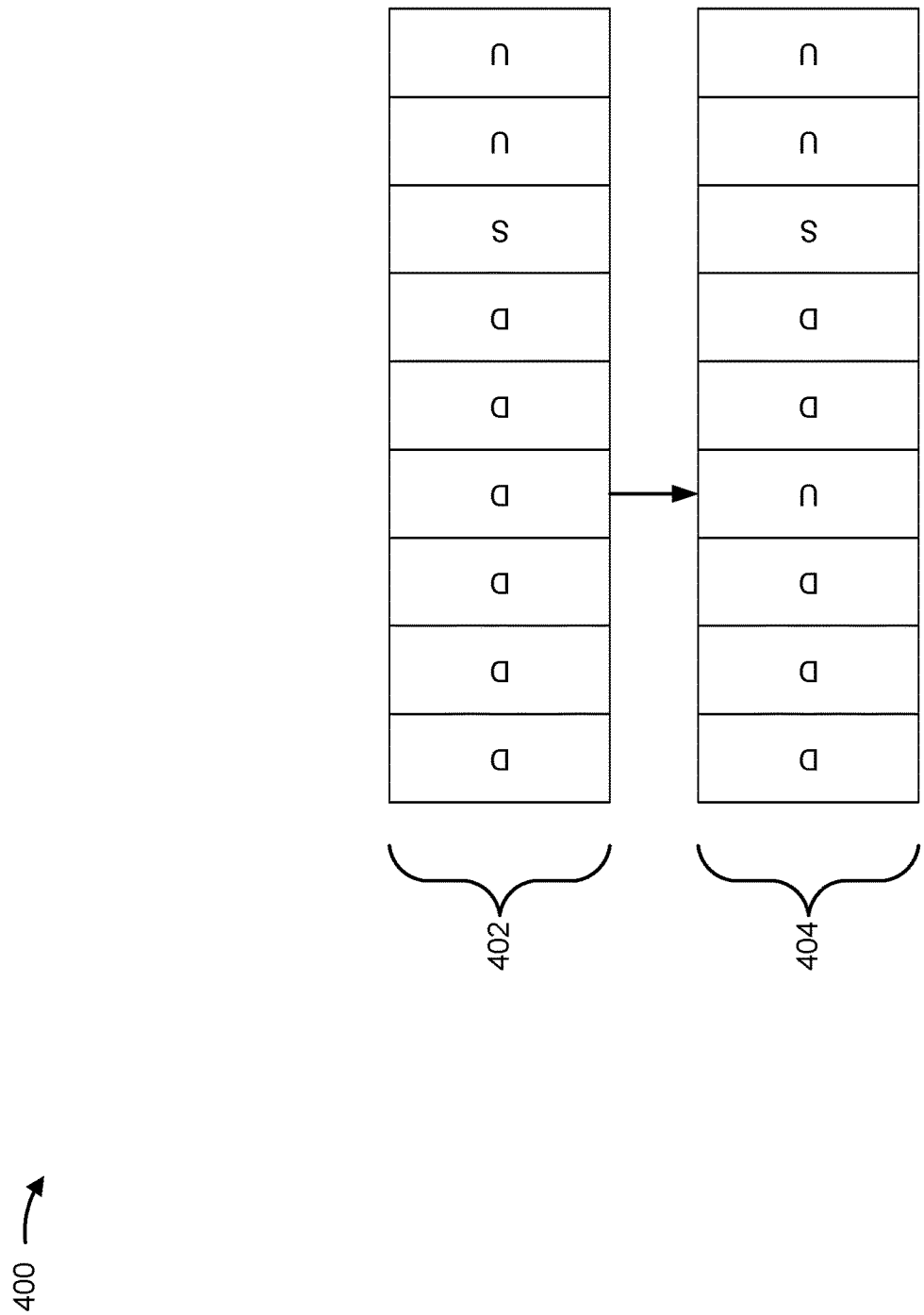

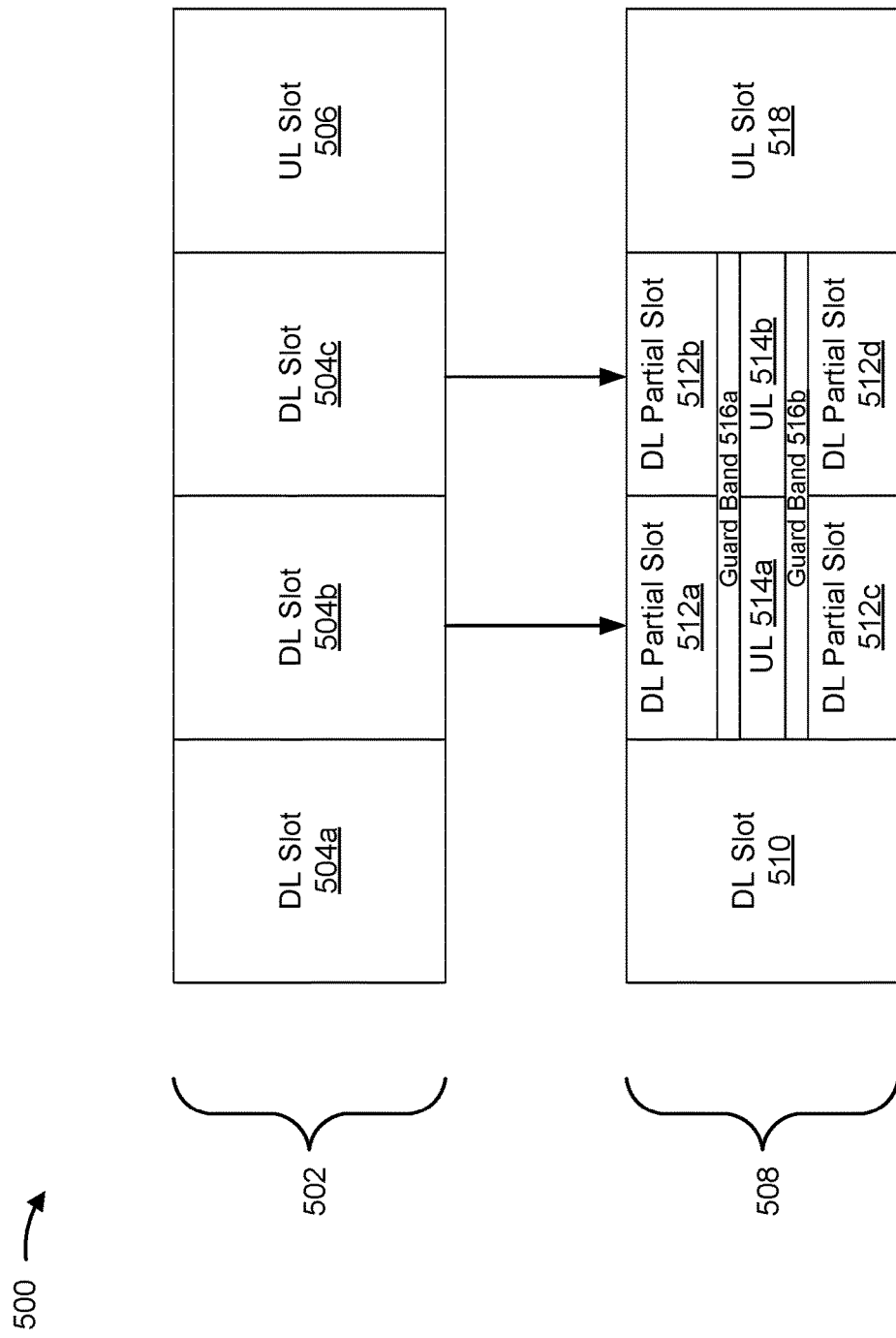

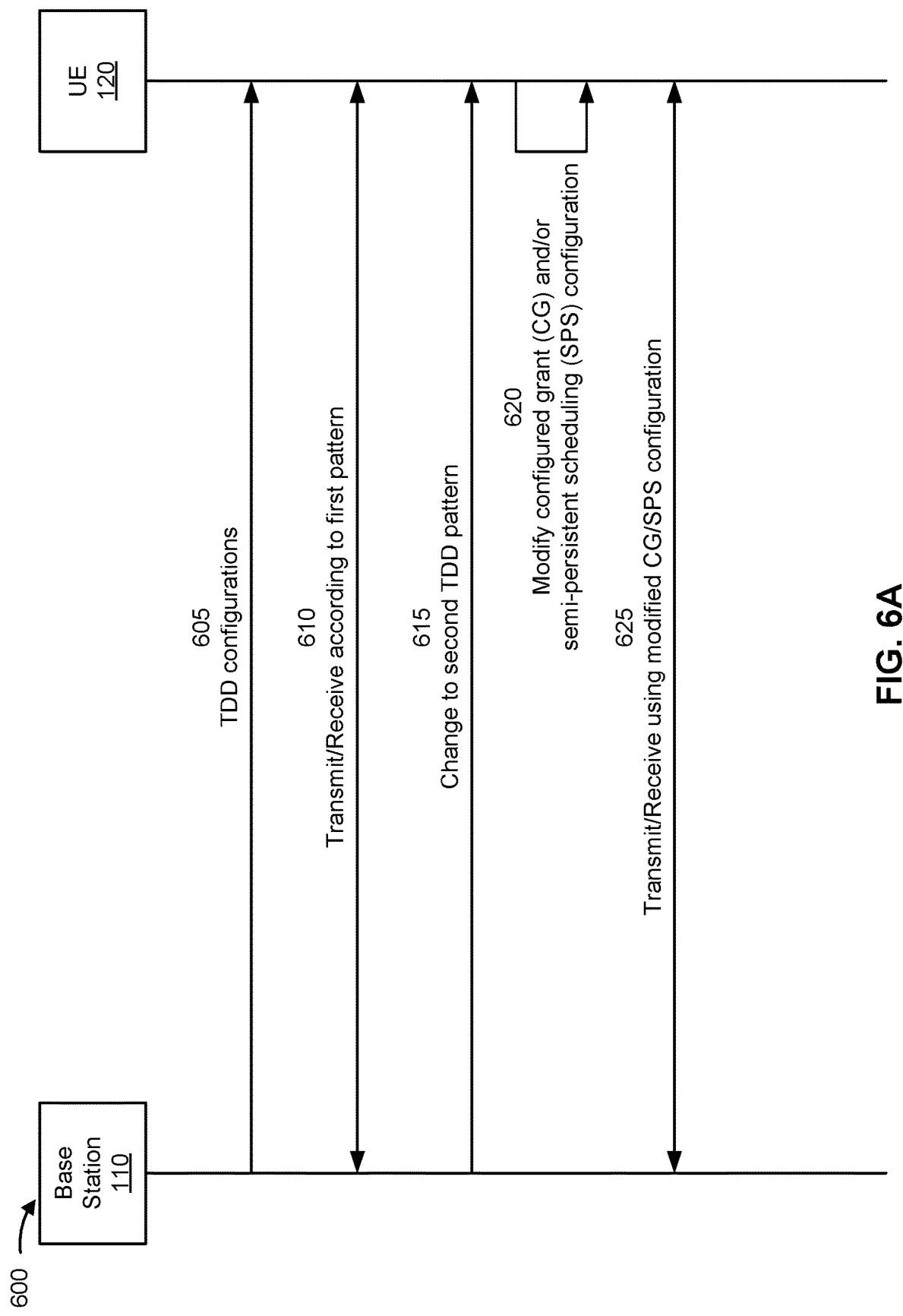

MODIFICATIONS TO CONFIGURED GRANTS AND SEMI-PERSISTENT SCHEDULING CONFIGURATIONS BASED ON TIME DOMAIN PATTERNS

FIELD OF THE DISCLOSURE

Aspects of the present disclosure generally relate to wireless communication and to techniques and apparatuses for modifying configured grants and semi-persistent scheduling configurations based on time domain patterns.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors coupled to the memory, the memory and the one or more processors configured to receive, from a base station, an indication of at least one of a configured grant or a semi-persistent scheduling (SPS) configuration; and transmit or receive, based at least in part on a modification to the at least one of the configured grant or the SPS configuration, wherein the modification is based at least in part on a change from a first time domain pattern to a second time domain pattern.

In some aspects, a base station for wireless communication includes a memory and one or more processors coupled to the memory, the memory and the one or more processors configured to transmit, to a UE, an indication of at least one of a configured grant or an SPS configuration; and transmit or receive, based at least in part on a modification to the at least one of the configured grant or the SPS configuration, wherein the modification is based at least in part on a change from a first time domain pattern to a second time domain pattern.

In some aspects, a method of wireless communication performed by a UE includes receiving, from a base station, an indication of at least one of a configured grant or an SPS configuration; and transmitting or receiving, based at least in part on a modification to the at least one of the configured grant or the SPS configuration, wherein the modification is based at least in part on a change from a first time domain pattern to a second time domain pattern.

In some aspects, a method of wireless communication performed by a base station includes transmitting, to a UE, an indication of at least one of a configured grant or an SPS configuration; and transmitting or receiving, based at least in part on a modification to the at least one of the configured grant or the SPS configuration, wherein the modification is based at least in part on a change from a first time domain pattern to a second time domain pattern.

In some aspects, a non-transitory computer-readable medium storing a set of instructions for wireless communication includes one or more instructions that, when executed by one or more processors of a UE, cause the UE to receive, from a base station, an indication of at least one of a configured grant or an SPS configuration; and transmit or receive, based at least in part on a modification to the at least one of the configured grant or the SPS configuration, wherein the modification is based at least in part on a change from a first time domain pattern to a second time domain pattern.

In some aspects, a non-transitory computer-readable medium storing a set of instructions for wireless communication includes one or more instructions that, when executed by one or more processors of a base station, cause the base station to transmit, to a UE, an indication of at least one of a configured grant or an SPS configuration; and transmit or receive, based at least in part on a modification to the at least one of the configured grant or the SPS configuration, wherein the modification is based at least in part on a change from a first time domain pattern to a second time domain pattern.

In some aspects, an apparatus for wireless communication includes means for receiving, from a base station, an indication of at least one of a configured grant or an SPS configuration; and means for transmitting or means for receiving, based at least in part on a modification to the at least one of the configured grant or the SPS configuration, wherein the modification is based at least in part on a change from a first time domain pattern to a second time domain pattern.

In some aspects, an apparatus for wireless communication includes means for transmitting, to a UE, an indication of at least one of a configured grant or an SPS configuration; and means for transmitting or means for receiving, based at least in part on a modification to the at least one of the configured grant or the SPS configuration, wherein the modification is based at least in part on a change from a first time domain pattern to a second time domain pattern.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of opportunistic conversion of slots or symbols, in accordance with the present disclosure.

FIG. 5 is a diagram illustrating an example of opportunistic sub-band full duplex (SBFD), in accordance with the present disclosure.

FIGS. 6A and 6B are diagrams illustrating examples associated with modifying configured grants (CGs) and semi-persistent scheduling (SPS) configurations based on time domain patterns, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
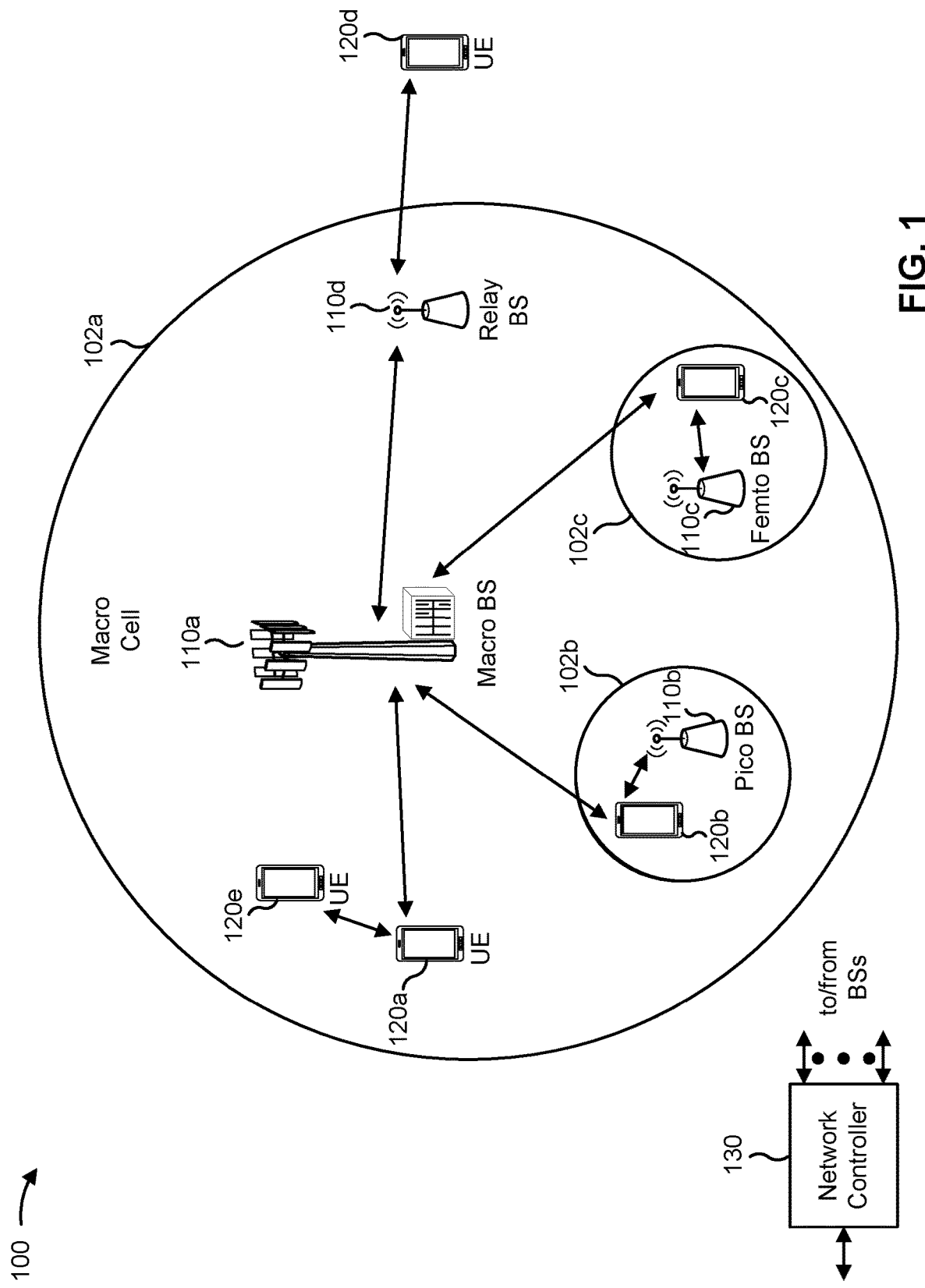
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz—300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
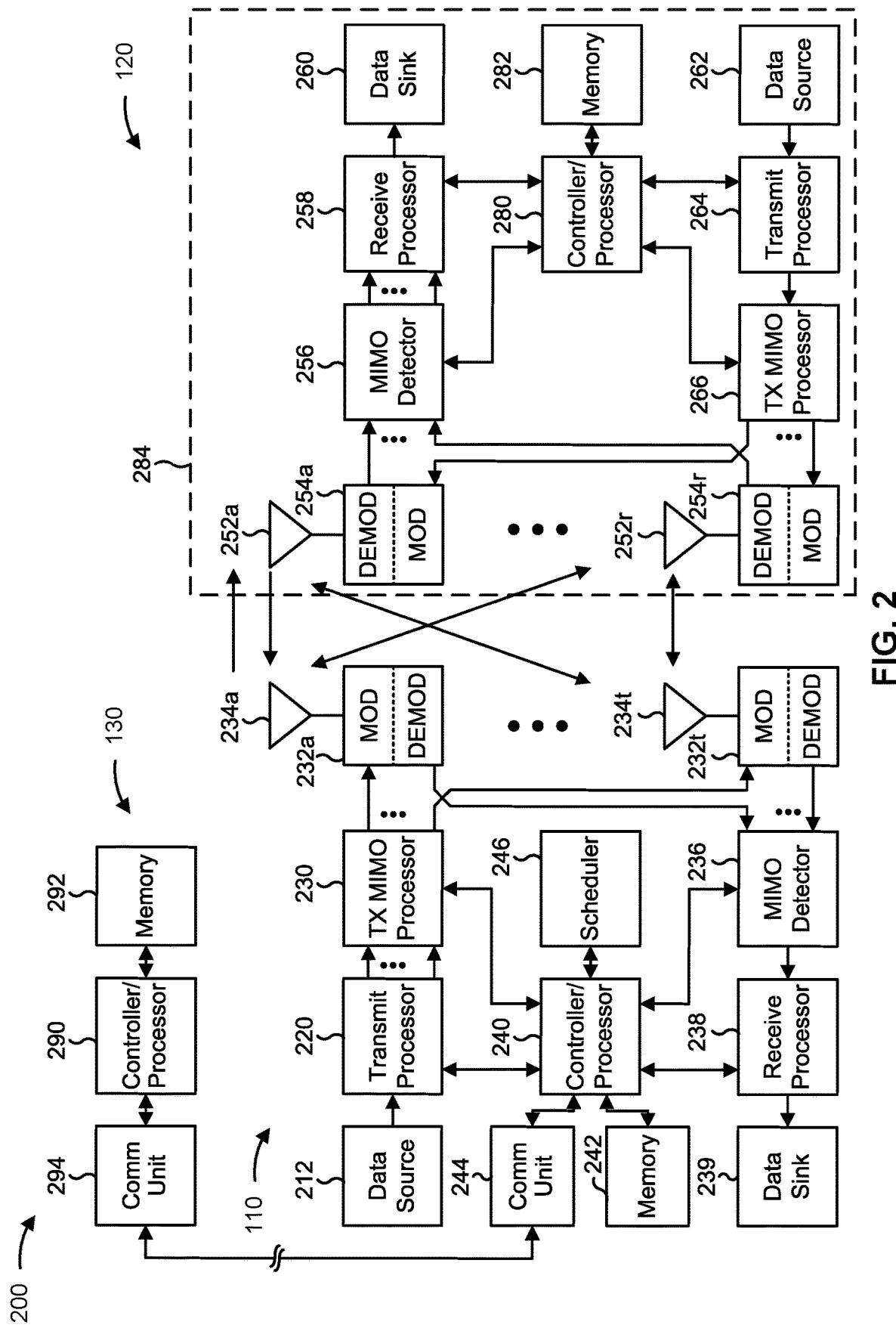
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 6A-6B).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 6A-6B).

Controller/processor 240 of base station 110, controller/processor 280 of UE 120, and/or any other component(s) of FIG. 2 may perform one or more techniques associated with modifying CGs and SPS configurations based on time domain patterns, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a UE (e.g., the UE 120 and/or apparatus 900 of FIG. 9) may include means for receiving, from a base station (e.g., the base station 110 and/or apparatus 1000 of FIG. 10), an indication of at least one of a configured grant or an SPS configuration; and/or means for transmitting and/or means for receiving, based at least in part on a modification to the at least one of the configured grant or the SPS configuration, wherein the modification is based at least in part on a change from a first time domain pattern to a second time domain pattern. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE may further include means for receiving, from the base station, an instruction to switch from the first time domain pattern to the second time domain pattern. Additionally, or alternative, the UE may include means for transmitting, to the base station, an indication that the UE has switched from the first time domain pattern to the second time domain pattern.

In some aspects, the UE may further include means for receiving, from the base station, an indication of the modification. Additionally, or alternatively, the UE may include means for receiving, from the base station, an activation associated with the Type 1 configured grant. As an alternative, the UE may include means for refraining from transmitting using the Type 1 configured grant based at least in part on the change from the first time domain pattern to the second time domain pattern.

In some aspects, a base station (e.g., the base station 110 and/or apparatus 1000 of FIG. 10) may include means for transmitting, to a UE (e.g., the UE 120 and/or apparatus 900 of FIG. 9), an indication of at least one of a configured grant or an SPS configuration; and/or means for transmitting and/or means for receiving, based at least in part on a modification to the at least one of the configured grant or the SPS configuration, wherein the modification is based at least in part on a change from a first time domain pattern to a second time domain pattern. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station may further include means for transmitting, to the UE, an instruction to switch from the first time domain pattern to the second time domain pattern. Additionally, or alternatively, the base station may include means for receiving, from the UE, an indication that the UE has switched from the first time domain pattern to the second time domain pattern.

In some aspects, the base station may further include means for transmitting, to the UE, an indication of the modification. Additionally, or alternatively, the base station may include means for transmitting, to the UE, an activation associated with the Type 1 configured grant. As an alternative, the base station may include means for refraining from receiving using the Type 1 configured grant based at least in part on the change from the first time domain pattern to the second time domain pattern.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
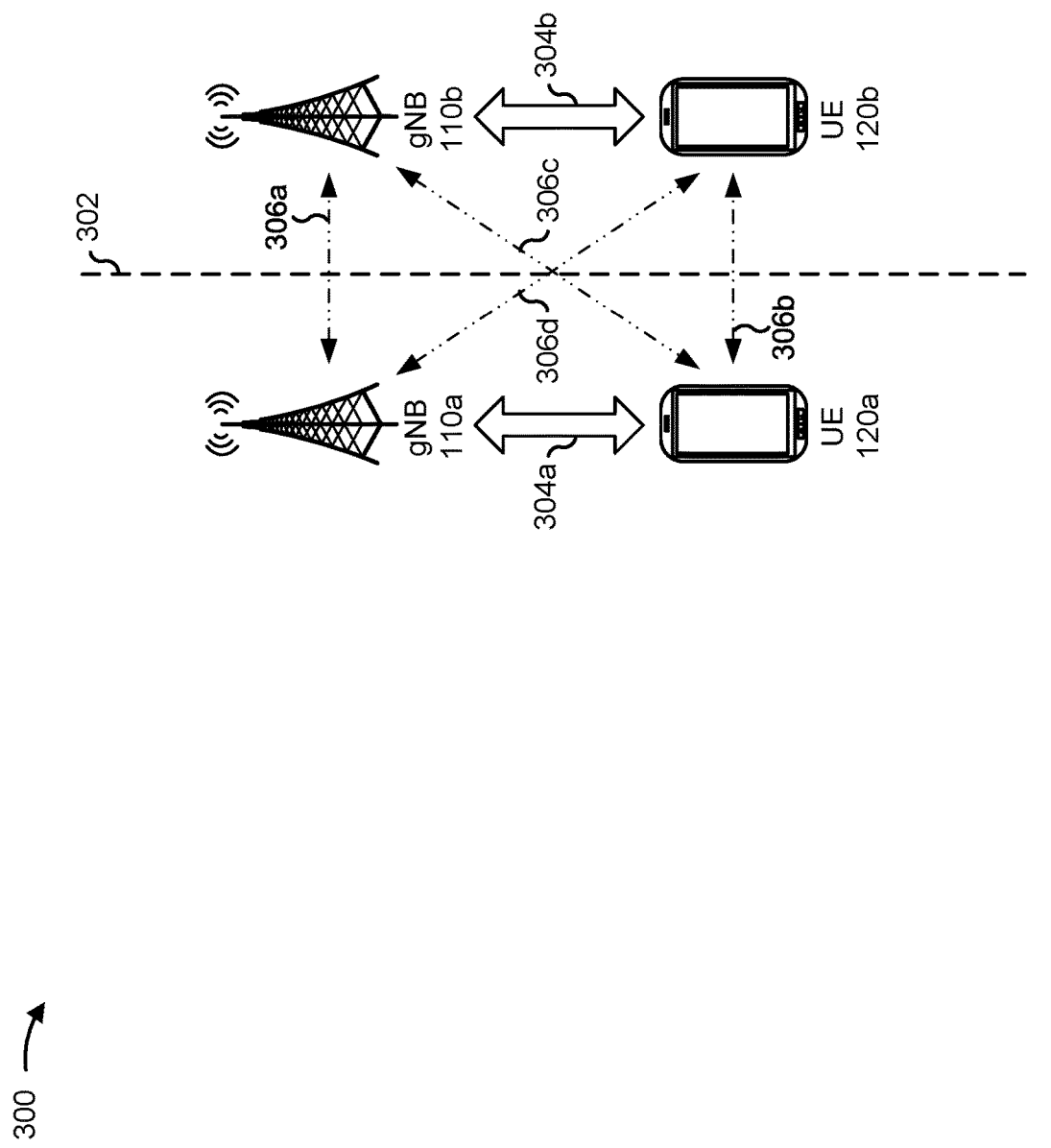
FIG. 3 is a diagram illustrating an example of cross-border interference, in accordance with the present disclosure.

FIG. 3 is a diagram illustrating an example 300 of cross-border interference, in accordance with the present disclosure. As shown in FIG. 3, example 300 includes a gNB 110a communicating wirelessly with a UE 120a on a first cell (e.g., using a first wireless link 304a) and a gNB 110b communicating wirelessly with a UE 120b on a second cell (e.g., using a second wireless link 304b). Accordingly, a border 302 may separate the cells.

In some aspects, the first cell and the second cell may be associated with a same operator or with operators that cooperate. Accordingly, the gNB 110a and the gNB 110b may coordinate (e.g., using a wired and/or wireless backhaul) to reduce interference between signals carrying communications between the gNB 110a and the UE 120a and signals carrying communications between the gNB 110b and the UE 120b. For example, the gNB 110a and the gNB 110b may select resources in time, frequency, and/or space that are less likely to interfere with each other. However, when the first cell and/or the second cell are using an asynchronous mode of operation, the gNB 110a and the gNB 110b may be unable to coordinate. As an alternative, the first cell and the second cell may be associated with operators that do not cooperate. Accordingly, the gNB 110a and the gNB 110b may be unable to coordinate.

When the gNB 110a and the gNB 110b do not coordinate, and as shown in FIG. 3, interference 306a can occur between the gNB 110a and the gNB 110b (e.g., the gNB 110a transmits a downlink communication to the UE 120a that interferes with a downlink communication from the gNB 110b to the UE 120b). Similarly, interference 306b can occur between the UE 120a and the UE 120b (e.g., the UE 120a transmits an uplink communication to the gNB 110a that interferes with an uplink communication from the UE 120b to the gNB 110b).

Additionally, and as further shown in FIG. 3, interference 306c can occur between the gNB 110b and the UE 120a (e.g., the gNB 110b transmits a downlink communication to the UE 120b that interferes with a downlink communication from the gNB 110a to the UE 120a or the UE 120a transmits an uplink communication to the gNB 110a that interferes with an uplink communication from the UE 120b to the gNB 110b). Similarly, interference 306d can occur between the gNB 110a and the UE 120b (e.g., the gNB 110a transmits a downlink communication to the UE 120a that interferes with a downlink communication from the gNB 110b to the UE 120b or the UE 120b transmits an uplink communication to the gNB 110b that interferes with an uplink communication from the UE 120a to the gNB 110a). These interferences can decrease quality and/or reliability of communications on the first cell and/or the second cell. Additionally, these interferences can reduce throughput and/or increase latency by causing communication losses and thus additional retransmissions.

As indicated above, FIG. 3 is provided as an example. Other examples may differ from what is described with respect to FIG. 3.

FIG. 4 is a diagram illustrating an example 400 of opportunistic conversion of slots or symbols, in accordance with the present disclosure. As shown in FIG. 4, example 400 includes a first time domain pattern 402. For example, the time domain pattern 402 may include a time division duplex (TDD) pattern. The time domain pattern 402 may include a quantity of downlink slots (e.g., six downlink slots "D" as shown in example 400), a quantity of flexible slots (e.g., one flexible slot "S" as shown in example 400), and/or a quantity of uplink slots (e.g., two uplink slots "U" as shown in example 400). As used herein, "slot" may refer to a portion of a subframe, which in turn may be a fraction of a radio frame within an LTE, 5G, or other wireless communication structure. In some aspects, a slot may include one or more symbols. Additionally, "symbol" may refer to an OFDM symbol or another similar symbol within a slot. The first time domain pattern 402 may repeat over time. Although described below with reference to slots, the description similarly applies to a first TDD pattern with symbols (e.g., including six downlink symbols "D," one flexible symbol "S," and two uplink symbols "U," as shown in example 400).

As further shown in FIG. 4, a base station (e.g., base station 110) may instruct a UE (e.g., UE 120) to switch from the first time domain pattern 402 to the second time domain pattern 404. As an alternative, the UE 120 may indicate to the base station 110 that the UE 120 is switching from the first time domain pattern 402 to the second time domain pattern 404. The second time domain pattern 404 may repeat over time, similar to the first time domain pattern 402.

In example 400, the second time domain pattern 404 includes an uplink slot "U" in place of what was a downlink slot "D" in the first time domain pattern 402. Accordingly, the UE 120 may transmit an uplink communication in an earlier slot. Other examples may include additional or alternative changes. For example, the second time domain pattern may include a downlink slot in place of what was an uplink slot in the first time domain pattern. In another example, the second time domain pattern may include a downlink slot or an uplink slot in place of what was a flexible slot in the first time domain pattern. In yet another example, the second time domain pattern may include a flexible slot in place of what was a downlink slot or an uplink slot in the first time domain pattern.

By opportunistically switching from the first time domain pattern 402 to the second time domain pattern 404, the base station 110 may reduce interference (e.g., cross-border interference as described above in connection with FIG. 3). As a result, the base station 110 and the UE 120 may experience increased quality and/or reliability of communications. Additionally, or alternatively, the base station 110 may reduce latency by opportunistically switching from the first time domain pattern 402 to the second time domain pattern 404. For example, the UE 120 may be able to transmit an uplink communication sooner using the second time domain pattern 404 rather than the first time domain pattern 402. In another example, the base station 110 may be able to transmit a downlink communication sooner using the second time domain pattern rather than first time domain pattern.

As indicated above, FIG. 4 is provided as an example. Other examples may differ from what is described with respect to FIG. 4.

FIG. 5 is a diagram illustrating an example 500 of opportunistic SBFD, in accordance with the present disclosure. As shown in FIG. 5, example 500 includes a first time domain pattern 502. In some aspects, the first time domain pattern 502 may include a slot format pattern associated with a half duplex mode or a full duplex mode. The time domain pattern 502 may include a quantity of downlink slots (e.g., three downlink slots 504a, 504b, and 504c as shown in example 500), a quantity of flexible slots, and/or a quantity of uplink slots (e.g., one uplink slot 506 as shown in example 500). The first time domain pattern 502 may repeat over time. Although described below with reference to slots, the description similarly applies to a first time domain pattern with symbols (e.g., including three downlink symbols, no flexible symbols, and one uplink symbol, as shown in example 500).

As further shown in FIG. 5, a base station (e.g., base station 110) may instruct a UE (e.g., UE 120) to switch from the first time domain pattern 502 to the second time domain pattern 508. As an alternative, the UE 120 may indicate to the base station 110 that the UE 120 is switching from the first time domain pattern 502 to the second time domain pattern 508. The second time domain pattern 508 may repeat over time, similar to the first time domain pattern 502.

In example 500, the second time domain pattern 508 includes a downlink slot 510 similar to downlink slot 504a and an uplink slot 518 similar to uplink slot 506. However, the second time domain pattern 508 also includes two SBFD slots in place of what were downlink slots in the first time domain pattern 502. In example 500, each SBFD slot includes a partial slot (e.g., a portion or sub-band of a frequency allocated for use by the base station 110 and the UE 120) for downlink (e.g., partial slots 512a, 512b, 512c, and 512d, as shown in example 500) and a partial slot for uplink (e.g., partial slots 514a and 514b, as shown in example 500). In some aspects, partial slots for downlink may be separated from partial slots for uplink by guard bands including one or more frequencies. For example, as shown in FIG. 5, partial slots 512a and 512b for downlink are separated from partial slots 514a and 514b for uplink by guard band 516a. Similarly, partial slots 512c and 512d for downlink are separated from partial slots 514a and 514b for uplink by guard band 516b.

Accordingly, the UE 120 may transmit an uplink communication in an earlier slot. Other examples may include additional or alternative changes. For example, the second time domain pattern may include an SBFD slot in place of what was an uplink slot in the first time domain pattern. In another example, the second time domain pattern may include a downlink slot or an uplink slot in place of what was an SBFD in the first time domain pattern. In yet another example, the second time domain pattern may include a downlink slot or an uplink slot in place of what was an uplink slot or a downlink slot, respectively, in the first time domain pattern.

By opportunistically switching from the first time domain pattern 502 to the second time domain pattern 508, the base station 110 may reduce interference (e.g., cross-border interference as described above in connection with FIG. 3). As a result, the base station 110 and the UE 120 may experience increased quality and/or reliability of communications. Additionally, or alternatively, the base station 110 may reduce latency by opportunistically switching from the first time domain pattern 502 to the second time domain pattern 508. For example, the UE 120 may be able to transmit an uplink communication sooner using the second time domain pattern 508 rather than the first time domain pattern 502. In another example, the base station 110 may be able to transmit a downlink communication sooner using the second time domain pattern rather than first time domain pattern.

As indicated above, FIG. 5 is provided as an example. Other examples may differ from what is described with respect to FIG. 5.

A base station and/or a UE may use opportunistic slot or symbol conversion and/or opportunistic sub-band full duplex in order to reduce cross-border interference, reduce latency for upcoming downlink communications or uplink communications, and/or increase throughput. However, a change in time domain patterns may affect configured grants that the UE uses to transmit uplink communications to the base station and/or SPS configurations that the UE uses to receive downlink communications from the base station. Accordingly, the base station may reconfigure all of the configured grants and/or SPS configurations based at least in part on the time domain pattern change. However, this results in significant network overhead for the base station and the UE, which also causes the base station and the UE to consume network and decoding resources.

Some techniques and apparatuses described herein enable modifications to configured grants and/or SPS configurations based at least in part on time domain pattern changes. For example, a base station (e.g., base station 110) may transmit an instruction to a UE (e.g., UE 120) to use a new time domain pattern such that the UE 120 and the base station 110 can continue to use existing configured grants and/or SPS configurations with minor alterations. As a result, the base station 110 and the UE 120 conserve network overhead, transmission resources, and decoding resources. Similarly, the UE 120 may transmit an indication to the base station 110 that the UE 120 is using a new time domain pattern, and the base station 110 and the UE 120 can continue to use existing configured grants and/or SPS configurations with minor alterations. As a result, the base station 110 and the UE 120 conserve network overhead, transmission resources, and decoding resources.

FIG. 6A is a diagram illustrating an example 600 associated with modifying configured grants and SPS configurations based on time domain patterns, in accordance with the present disclosure. As shown in FIG. 6A, a base station 110 and a UE 120 may communicate with one another.

As shown in connection with reference number 605, the base station 110 may transmit, and the UE 120 may receive, one or more indications of at least one of a configured grant or an SPS configuration. The indication(s) may include one or more radio resource control (RRC) messages (e.g., including a ConfiguredGrantConfig data structure as defined in 3GPP specifications and/or another standard, an SPS-Config data structure as defined in 3GPP specifications and/or another standard, and/or other similar data structures), one or more medium access control (MAC) layer control elements (MAC-CEs), and/or downlink control information (DCI) (e.g., DCI at least partially scrambled using a configured scheduling radio network temporary identifier (CS-RNTI), as defined in 3GPP specifications and/or another standard).

As shown in connection with reference number 610, the base station 110 and the UE 120 may transmit and/or receive based at least in part on a first time domain pattern (e.g., a time domain pattern as described above in connection with FIG. 4 and/or FIG. 5). For example, the UE 120 may transmit, and the base station 110 may receive, one or more uplink communications in an uplink slot, a flexible slot, and/or an SBFD slot. Additionally, or alternatively, the base station 110 may transmit, and the UE 120 may receive, one or more downlink communications in a downlink slot, a flexible slot, and/or an SBFD slot.

In some aspects the first time domain pattern may be one of a plurality of candidate time domain patterns. For example, the base station 110 may transmit, and the UE 120 may receive, one or more indications of the plurality of candidate time domain patterns. The indication(s) may include one or more RRC messages (e.g., including a TDD-UL-DL-ConfigurationCommon data structure as defined in 3GPP specifications and/or another standard, a TDD-UL-DL-ConfigDedicated data structure as defined in 3GPP specifications and/or another standard, and/or other similar data structures), one or more MAC-CEs, and/or DCI (e.g., DCI format 2_0 including a slot format indicator (SFI) associated with a SlotFormatCombination data structure, as defined in 3GPP specifications and/or another standard).

As shown in connection with reference number 615, the base station 110 may transmit, and the UE 120 may receive, an instruction to switch from the first time domain pattern to a second time domain pattern (e.g., a time domain pattern as described above in connection with FIG. 4 and/or FIG. 5). For example, the second time domain pattern may be included in the plurality of candidate time domain patterns. Accordingly, the base station 110 may transmit an RRC message, a MAC-CE, and/or DCI including an index and/or another indicator associated with the second time domain pattern. As an alternative, the UE 120 may indicate to the base station 110 that the UE 120 is switching from the first time domain pattern to the second time domain pattern. For example, the UE 120 may transmit an RRC message, a MAC-CE, and/or uplink control information (UCI) including the index and/or another indicator associated with the second time domain pattern. In some aspects, the UE 120 may transmit a request to use the second time domain pattern (e.g., in an RRC message, a MAC-CE, and/or UCI), and the base station 110 may transmit an approval of the request (e.g., in an RRC message, a MAC-CE, and/or DCI).

In some aspects the second time domain pattern may include a downlink slot or an uplink slot in place of what was an uplink slot or a downlink slot, respectively in the first time domain pattern. Additionally, or alternatively, the second time domain pattern may include a downlink slot or an uplink slot in place of what was a flexible slot in the first time domain pattern. Additionally, or alternatively, the second time domain pattern may include a flexible slot in place of what was an uplink slot or a downlink slot in the first time domain pattern. Other examples may additionally or alternatively include changes associated with SBFD. For example, the second time domain pattern may include an SBFD slot in place of what was an uplink slot or a downlink slot in the first time domain pattern. In another example, the second time domain pattern may include a downlink slot or an uplink slot in place of what was an SBFD slot in the first time domain pattern. Although described with reference to slots, this description similarly applies to time domain patterns using symbols (e.g., including downlink symbols, flexible symbols, uplink symbols, and/or SBFD symbols).

As shown in connection with reference number 620, the UE 120 may determine a modification, to the at least one of the configured grant or the SPS configuration, that is based at least in part on the change from the first time domain pattern to the second time domain pattern. In some aspects, the at least one of the configured grant or the SPS configuration may be associated with the first time domain pattern, and the modification may include a switch to at least one of an additional configured grant or an additional SPS configuration, associated with the second time domain pattern. For example, the one or more indications of the at least one of a configured grant or an SPS configuration (e.g., as described above in connection with reference number 605) may have further indicated the at least one of an additional configured grant or an additional SPS configuration. Accordingly, the base station 110 may transmit, and the UE 120 may receive, RRC messages (e.g., including a Config-uredGrantConfig data structure as defined in 3GPP specifications and/or another standard, an SPS-Config data structure as defined in 3GPP specifications and/or another standard, and/or other similar data structures), MAC-CEs, and/or DCI (e.g., DCI at least partially scrambled using a CS-RNTI, as defined in 3GPP specifications and/or another standard) that associate different configured grants and/or SPS configurations with different time domain patterns.

As an alternative, the modification may include a frequency domain offset (e.g., when the second time domain pattern has SBFD slots in place of half duplex or paired band full duplex slots in the first time domain pattern), a time domain offset (e.g., when the second time domain pattern has uplink slots or downlink slots in place of downlink slots or uplink slots, respectively, in the first time domain pattern), an MCS offset, or a combination thereof. Accordingly, the UE 120 may determine the modification based at least in part on at least one programmed (and/or otherwise preconfigured) rule (e.g., according to 3GPP specifications and/or another standard). For example, the at least one rule may be stored in a memory of the UE 120.

In one example, the at least one rule may indicate that an uplink transmission, scheduled in a slot that was an uplink slot in the first time domain pattern and is a downlink slot in the second time domain pattern, is offset to a subsequent slot that is an uplink slot in the second time domain pattern. Additionally, or alternatively, the at least one rule may indicate that a downlink transmission, scheduled in a slot that was a downlink slot in the first time domain pattern and is an uplink slot in the second time domain pattern, is offset to a subsequent slot that is a downlink slot in the second time domain pattern. Additionally, or alternatively, the at least one rule may indicate that an uplink transmission, scheduled in a slot that was an uplink slot in the first time domain pattern and is a full duplex slot in the second time domain pattern, is transmitted using a configuration associated with a full duplex mode of the UE 120. For example, the configuration associated with the full duplex mode may have a different frequency domain allocation, MCS, beam, and/or other physical or coding property as compared with a configuration associated with a half duplex mode of the UE 120. Additionally, or alternatively, the at least one rule may indicate that a downlink transmission, scheduled in a slot that was a downlink slot in the first time domain pattern and is a full duplex slot in the second time domain pattern, is received using the configuration associated with the full duplex mode of the UE 120.

Accordingly, as shown in connection with reference number 625, the base station 110 and the UE 120 may transmit and/or receive based at least in part on the modification to the at least one of the configured grant or the SPS configuration. For example, the UE 120 may transmit, and the base station 110 may receive, one or more uplink communications in an uplink slot, a flexible slot, and/or an SBFD slot, in the second pattern and based at least in part on the modification. Additionally, or alternatively, the base station 110 may transmit, and the UE 120 may receive, one or more downlink communications in a downlink slot, a flexible slot, and/or an SBFD slot, in the second pattern and based at least in part on the modification.

In some aspects, the at least one of the configured grant or the SPS configuration may include a Type 1 configured grant. As defined in 3GPP specifications, a Type 1 configured grant may be used by the UE 120 without receiving activation DCI from the base station 110. In some aspects, the UE 120 may refrain from transmitting, and the base station 110 may refrain from receiving, using the Type 1 configured grant based at least in part on the change from the first time domain pattern to the second time domain pattern. As an alternative, the base station 110 may transmit, and the UE 120 may receive, an activation (e.g., DCI and/or another activation message) associated with the Type 1 configured grant. Accordingly, the UE 120 may treat a Type 1 configured grant similar to a Type 2 configured grant (which cannot be used by the UE 120 without activation DCI from the base station 110 according to 3GPP specifications) based at least in part on the change from the first time domain pattern to the second time domain pattern. Thus, the UE 120 may apply the modification and use the Type 1 configured grant based at least in part on the activation.

Figure 6B:
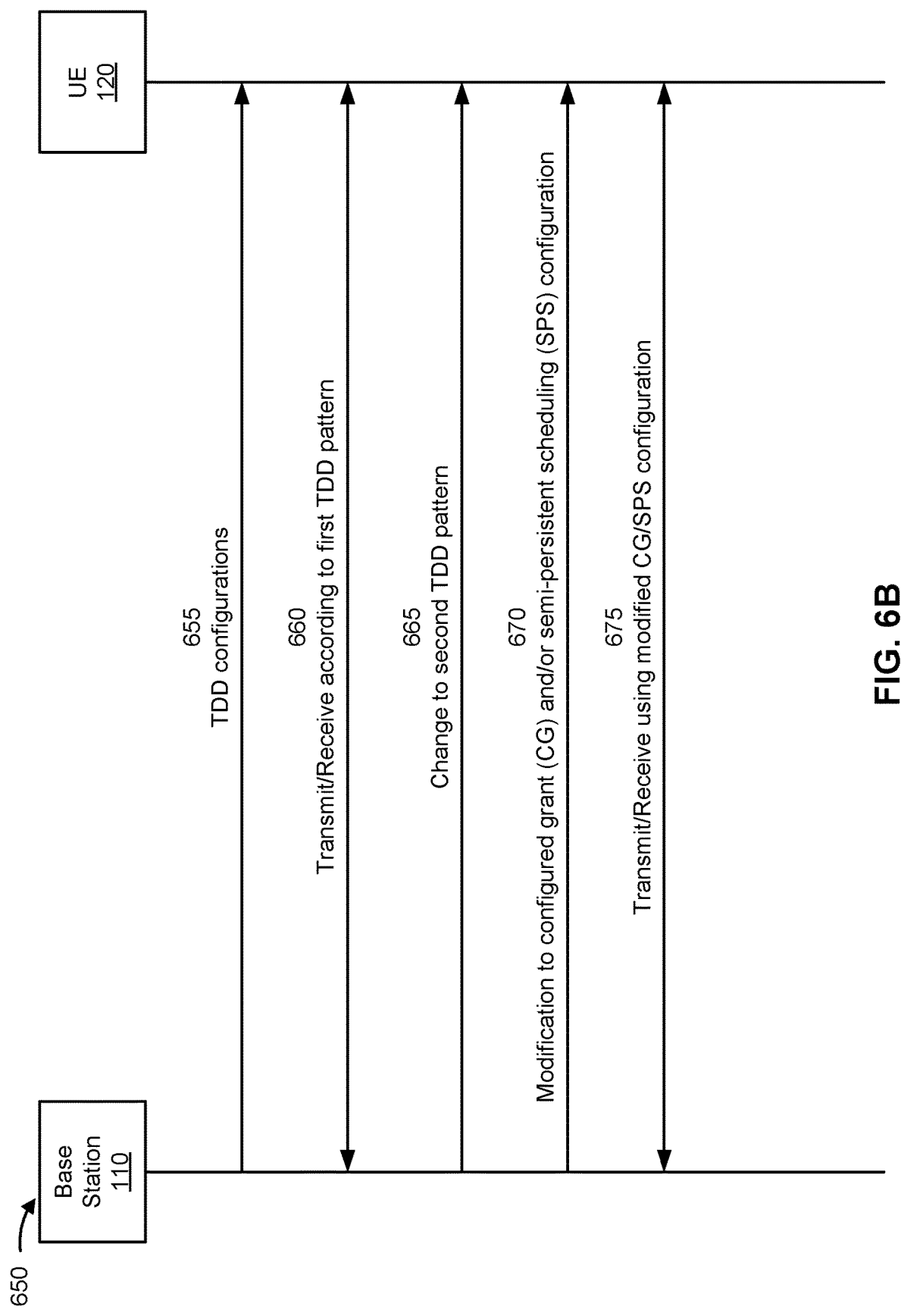

FIG. 6B is a diagram illustrating an example 650 associated with modifying configured grants and SPS configurations based on time domain patterns, in accordance with the present disclosure. As shown in FIG. 6B, a base station 110 and a UE 120 may communicate with one another.

As shown in connection with reference number 655, the base station 110 may transmit, and the UE 120 may receive, one or more indications of at least one of a configured grant or an SPS configuration. The indication(s) may include one or more RRC messages (e.g., including a ConfiguredGrant-Config data structure as defined in 3GPP specifications and/or another standard, an SPS-Config data structure as defined in 3GPP specifications and/or another standard, and/or other similar data structures), one or more MAC-CEs, and/or DCI (e.g., DCI at least partially scrambled using a CS-RNTI, as defined in 3GPP specifications and/or another standard).

As shown in connection with reference number 660, the base station 110 and the UE 120 may transmit and/or receive based at least in part on a first time domain pattern (e.g., a time domain pattern as described above in connection with FIG. 4 and/or FIG. 5). For example, the UE 120 may transmit, and the base station 110 may receive, one or more uplink communications in an uplink slot, a flexible slot, and/or an SBFD slot. Additionally, or alternatively, the base station 110 may transmit, and the UE 120 may receive, one or more downlink communications in a downlink slot, a flexible slot, and/or an SBFD slot.

In some aspects the first time domain pattern may be one of a plurality of candidate time domain patterns. For example, the base station 110 may transmit, and the UE 120 may receive, one or more indications of the plurality of candidate time domain patterns. The indication(s) may include one or more RRC messages (e.g., including a TDD-UL-DL-ConfigurationCommon data structure as defined in 3GPP specifications and/or another standard, a TDD-UL-DL-ConfigDedicated data structure as defined in 3GPP specifications and/or another standard, and/or other similar data structures), one or more MAC-CEs, and/or DCI (e.g., DCI format 2_0 including an SFI associated with a SlotFormatCombination data structure, as defined in 3GPP specifications and/or another standard).

As shown in connection with reference number 665, the base station 110 may transmit, and the UE 120 may receive, an instruction to switch from the first time domain pattern to the second time domain pattern (e.g., a time domain pattern as described above in connection with FIG. 4 and/or FIG. 5). For example, the second time domain pattern may be included in the plurality of candidate time domain patterns. Accordingly, the base station 110 may transmit an RRC message, a MAC-CE, and/or DCI including an index and/or another indicator associated with the second time domain pattern. As an alternative, the UE 120 may indicate to the base station 110 that the UE 120 is switching from the first time domain pattern to the second time domain pattern. For example, the UE 120 may transmit an RRC message, a MAC-CE, and/or UCI including the index and/or another indicator associated with the second time domain pattern. In some aspects, the UE 120 may transmit a request to use the second time domain pattern (e.g., in an RRC message, a MAC-CE, and/or UCI), and the base station 110 may transmit an approval of the request (e.g., in an RRC message, a MAC-CE, and/or DCI).

In some aspects the second time domain pattern may include a downlink slot or an uplink slot in place of what was an uplink slot or a downlink slot, respectively in the first time domain pattern. Additionally, or alternatively, the second time domain pattern may include a downlink slot or an uplink slot in place of what was a flexible slot in the first time domain pattern. Additionally, or alternatively, the second time domain pattern may include a flexible slot in place of what was an uplink slot or a downlink slot in the first time domain pattern. Other examples may additionally or alternatively include changes associated with SBFD. For example, the second time domain pattern may include an SBFD slot in place of what was an uplink slot or a downlink slot in the first time domain pattern. In another example, the second time domain pattern may include a downlink slot or an uplink slot in place of what was an SBFD slot in the first time domain pattern. Although described with reference to slots, this description similarly applies to time domain patterns using symbols (e.g., including downlink symbols, flexible symbols, uplink symbols, and/or SBFD symbols).

As shown in connection with reference number 670, the base station 110 may transmit, and the UE 120 may receive, an indication of a modification, to the at least one of the configured grant or the SPS configuration, that is based at least in part on the change from the first time domain pattern to the second time domain pattern. In some aspects, the at least one of the configured grant or the SPS configuration may be associated with the first time domain pattern, and the modification may include a switch to at least one of an additional configured grant or an additional SPS configuration, associated with the second time domain pattern. For example, the base station 110 may transmit, and the UE 120 may receive, one or more indications of the at least one of an additional configured grant or an additional SPS configuration. Accordingly, the base station 110 may transmit, and the UE 120 may receive, one or more RRC messages (e.g., including a ConfiguredGrantConfig data structure as defined in 3GPP specifications and/or another standard, an SPS-Config data structure as defined in 3GPP specifications and/or another standard, and/or other similar data structures), one or more MAC-CEs, and/or DCI (e.g., DCI at least partially scrambled using a CS-RNTI, as defined in 3GPP specifications and/or another standard) that indicate the at least one of an additional configured grant or an additional SPS configuration.

As an alternative, the modification may include a frequency domain offset (e.g., when the second time domain pattern has SBFD slots in place of half duplex or paired band full duplex slots in the first time domain pattern), a time domain offset (e.g., when the second time domain pattern has uplink slots or downlink slots in place of downlink slots or uplink slots, respectively, in the first time domain pattern), an MCS offset, or a combination thereof. Accordingly, the base station 110 may transmit, and the UE 120 may receive, an RRC message, a MAC-CE, and/or DCI indicating the modification. For example, the indication may include an offset with respect the time domain allocation, the frequency domain allocation, the MCS, or the combination thereof, respectively, of the at least one of the configured grant or the SPS configuration, used with the first time domain pattern.

In one example, the base station 110 may indicate that an uplink transmission, scheduled in a slot that was an uplink slot in the first time domain pattern and is a downlink slot in the second time domain pattern, is offset to a subsequent slot that is an uplink slot in the second time domain pattern. Additionally, or alternatively, the base station 110 may indicate that a downlink transmission, scheduled in a slot that was a downlink slot in the first time domain pattern and is an uplink slot in the second time domain pattern, is offset to a subsequent slot that is a downlink slot in the second time domain pattern. Additionally, or alternatively, the base station 110 may indicate that an uplink transmission, scheduled in a slot that was an uplink slot in the first time domain pattern and is a full duplex slot in the second time domain pattern, is transmitted using a configuration associated with a full duplex mode of the UE 120. For example, the configuration associated with the full duplex mode may have a different frequency domain allocation, MCS, beam, and/or other physical or coding property as compared with a configuration associated with a half duplex mode of the UE 120. Additionally, or alternatively, the base station 110 may indicate that a downlink transmission, scheduled in a slot that was a downlink slot in the first time domain pattern and is a full duplex slot in the second time domain pattern, is received using the configuration associated with the full duplex mode of the UE 120.

Accordingly, as shown in connection with reference number 675, the base station 110 and the UE 120 may transmit and/or receive based at least in part on the modification to the at least one of the configured grant or the SPS configuration. For example, the UE 120 may transmit, and the base station 110 may receive, one or more uplink communications in an uplink slot, a flexible slot, and/or an SBFD slot, in the second pattern and based at least in part on the modification. Additionally, or alternatively, the base station 110 may transmit, and the UE 120 may receive, one or more downlink communications in a downlink slot, a flexible slot, and/or an SBFD slot, in the second pattern and based at least in part on the modification.

In some aspects, the at least one of the configured grant or the SPS configuration may include a Type 1 configured grant. As defined in 3GPP specifications, a Type 1 configured grant may be used by the UE 120 without receiving activation DCI from the base station 110. In some aspects, the UE 120 may refrain from transmitting, and the base station 110 may refrain from receiving, using the Type 1 configured grant based at least in part on the change from the first time domain pattern to the second time domain pattern. As an alternative, the base station 110 may transmit, and the UE 120 may receive, an activation (e.g., DCI and/or another activation message) associated with the Type 1 configured grant. The activation may be separate from or included in a same message as the indication of the modification.

Accordingly, the UE 120 may treat a Type 1 configured grant similar to a Type 2 configured grant (which cannot be used by the UE 120 without activation DCI from the base station 110 according to 3GPP specifications) based at least in part on the change from the first time domain pattern to the second time domain pattern. Thus, the UE 120 may apply the modification and use the Type 1 configured grant based at least in part on the activation.

By using techniques as described in connection with FIGS. 6A-6B, base station 110 may transmit an instruction to the UE 120 to use a new time domain pattern such that the UE 120 and the base station 110 can continue to use existing configured grants and/or SPS configurations with one or more modifications, such that the base station 110 and the UE 120 conserve network overhead, transmission resources, and decoding resources. Similarly, the UE 120 may transmit an indication to the base station 110 that the UE 120 is using a new time domain pattern, and the base station 110 and the UE 120 can continue to use existing configured grants and/or SPS configurations with one or more modifications, such that the base station 110 and the UE 120 conserve network overhead, transmission resources, and decoding resources.

As indicated above, FIGS. 6A-6B are provided as examples. Other examples may differ from what is described with respect to FIGS. 6A-6B.

Figure 7:
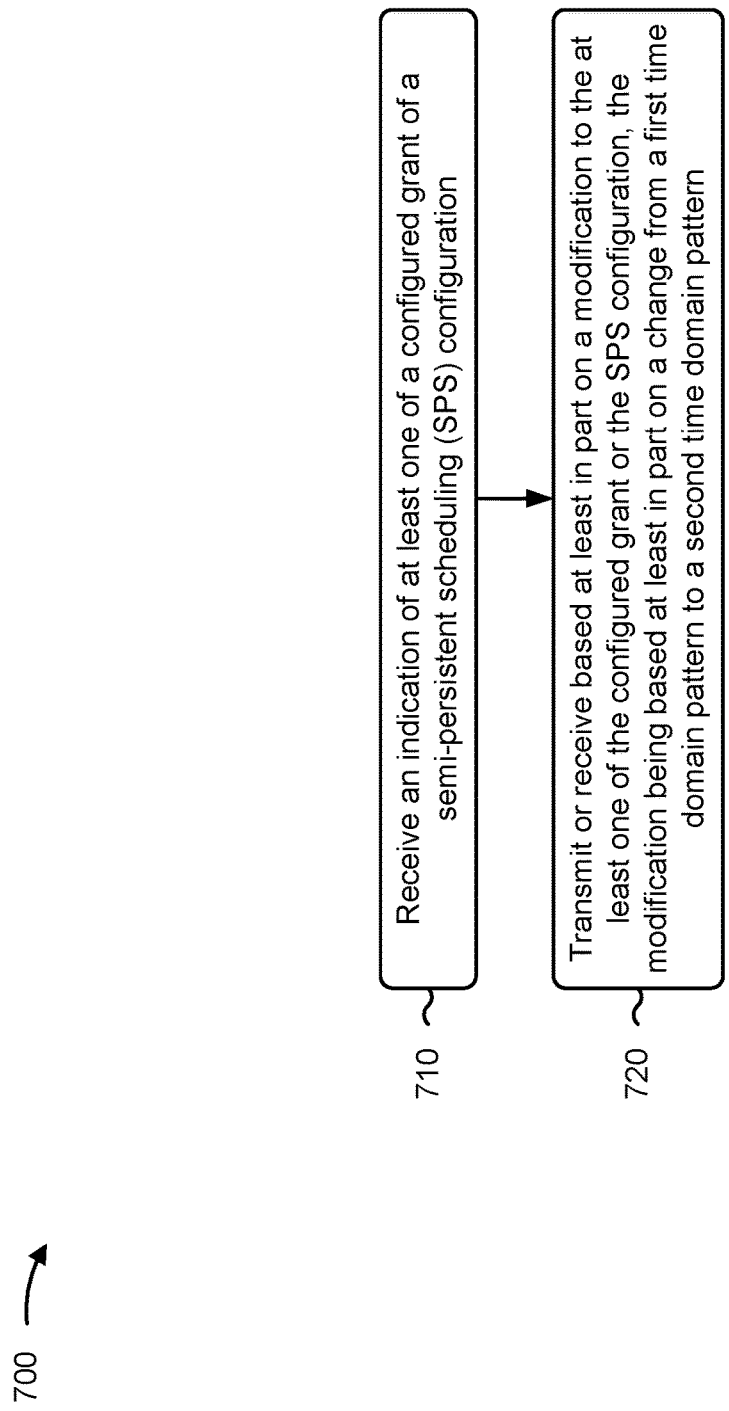
FIGS. 7 and 8 are diagrams illustrating example processes associated with using different time domain patterns based on a timer, in accordance with the present disclosure.

FIG. 7 is a diagram illustrating an example process 700 performed, for example, by a UE, in accordance with the present disclosure. Example process 700 is an example where the UE (e.g., UE 120 and/or apparatus 900 of FIG. 9) performs operations associated with modifying configured grants and SPS configurations based on time domain patterns.

As shown in FIG. 7, in some aspects, process 700 may include receiving, from a base station (e.g., base station 110 and/or apparatus 1000 of FIG. 10), an indication of at least one of a configured grant or an SPS configuration (block 710). For example, the UE (e.g., using reception component 902, depicted in FIG. 9) may receive the indication of at least one of a configured grant or an SPS configuration, as described above.

As further shown in FIG. 7, in some aspects, process 700 may include transmitting or receiving, based at least in part on a modification to the at least one of the configured grant or the SPS configuration (block 720). For example, the UE (e.g., using reception component 902 and/or transmission component 904, depicted in FIG. 9) may transmit or receive, based at least in part on the modification to the at least one of the configured grant or the SPS configuration, as described above. In some aspects, the modification is based at least in part on a change from a first time domain pattern to a second time domain pattern.

Process 700 may include additional aspects, such as any single aspect or any combination of aspects described below and/or in connection with one or more other processes described elsewhere herein.

In a first aspect, process 700 further includes receiving (e.g., using reception component 902), from the base station, an instruction to switch from the first time domain pattern to the second time domain pattern.

In a second aspect, alone or in combination with the first aspect, process 700 further includes transmitting (e.g., using transmission component 904), to the base station, an indication that the UE has switched from the first time domain pattern to the second time domain pattern.

In a third aspect, alone or in combination with one or more of the first and second aspects, the at least one of the configured grant or the SPS configuration is associated with the first time domain pattern, and the modification includes a switch to at least one of an additional configured grant or an additional SPS configuration, associated with the second time domain pattern.

In a fourth aspect, alone or in combination with one or more of the first through third aspects, process 700 further includes receiving (e.g., using reception component 902), from the base station, an indication of the modification.

In a fifth aspect, alone or in combination with one or more of the first through fourth aspects, the modification includes a frequency domain offset, a time domain offset, an MCS offset, or a combination thereof.

In a sixth aspect, alone or in combination with one or more of the first through fifth aspects, the modification is based at least in part on at least one rule stored in the memory of the UE.

In a seventh aspect, alone or in combination with one or more of the first through sixth aspects, the at least one rule indicates that an uplink transmission, scheduled in a slot that was an uplink slot in the first time domain pattern and is a downlink slot in the second time domain pattern, is offset to a subsequent slot that is an uplink slot in the second time domain pattern.

In an eighth aspect, alone or in combination with one or more of the first through seventh aspects, the at least one rule indicates that a downlink transmission, scheduled in a slot that was a downlink slot in the first time domain pattern and is an uplink slot in the second time domain pattern, is offset to a subsequent slot that is a downlink slot in the second time domain pattern.

In a ninth aspect, alone or in combination with one or more of the first through eighth aspects, the at least one rule indicates that an uplink transmission, scheduled in a slot that was an uplink slot in the first time domain pattern and is a full duplex slot in the second time domain pattern, is transmitted using a configuration associated with a full duplex mode of the UE.

In a tenth aspect, alone or in combination with one or more of the first through ninth aspects, the at least one rule indicates that a downlink transmission, scheduled in a slot that was a downlink slot in the first time domain pattern and is a full duplex slot in the second time domain pattern, is received using a configuration associated with a full duplex mode of the UE.

In an eleventh aspect, alone or in combination with one or more of the first through tenth aspects, process 700 further includes receiving (e.g., using reception component 902), from the base station, an activation associated with the Type 1 configured grant, and the modification is applied based at least in part on the activation.

In a twelfth aspect, alone or in combination with one or more of the first through eleventh aspects, process 700 further includes refraining from transmitting (e.g., using transmission component 904) using the Type 1 configured grant based at least in part on the change from the first time domain pattern to the second time domain pattern.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
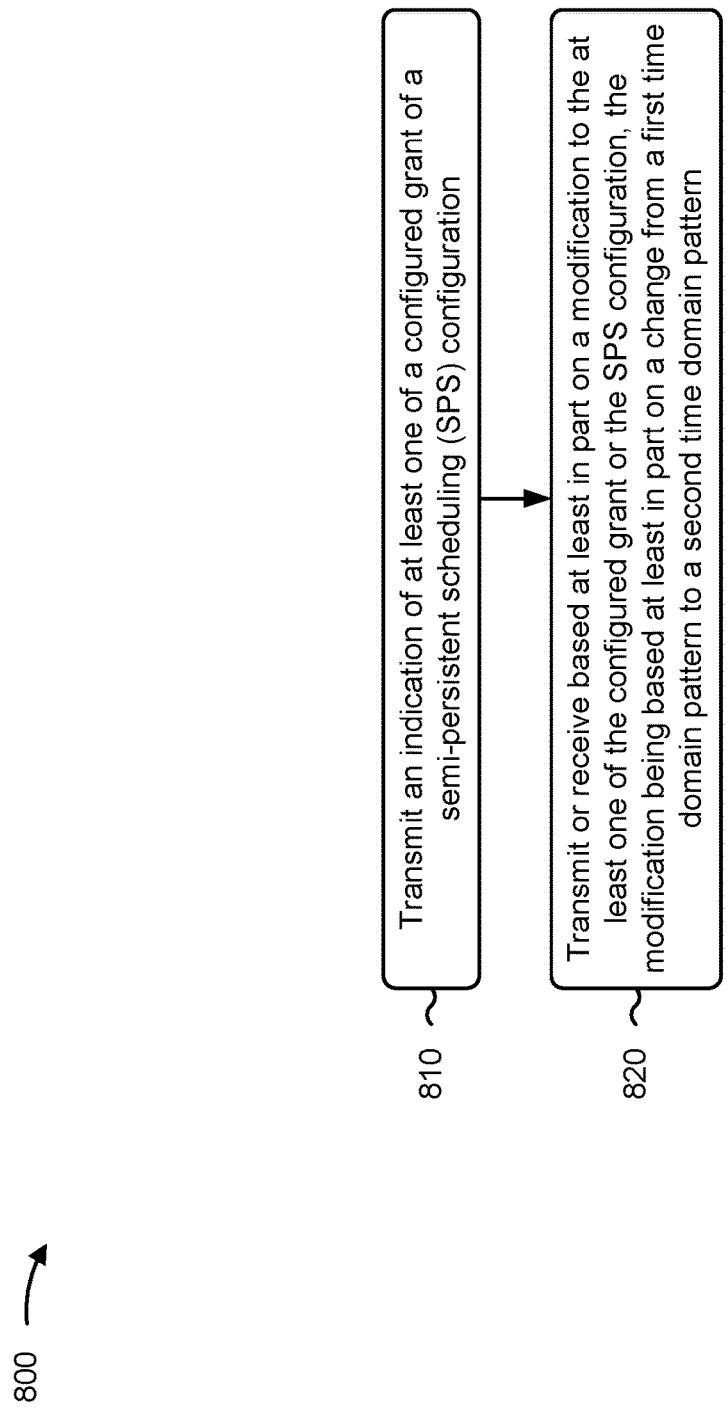

FIG. 8 is a diagram illustrating an example process 800 performed, for example, by a base station, in accordance with the present disclosure. Example process 800 is an example where the base station (e.g., base station 110 and/or apparatus 1000 of FIG. 10) performs operations associated with modifying configured grants and SPS configurations based on time domain patterns.

As shown in FIG. 8, in some aspects, process 800 may include transmitting, to a UE (e.g., UE 120 and/or apparatus 900 of FIG. 9), an indication of at least one of a configured grant or an SPS configuration (block 810). For example, the base station (e.g., using transmission component 1004, depicted in FIG. 10) may transmit the indication of at least one of a configured grant or an SPS configuration, as described above.

As further shown in FIG. 8, in some aspects, process 800 may include transmitting or receiving, based at least in part on a modification to the at least one of the configured grant or the SPS configuration (block 820). For example, the base station (e.g., using transmission component 1004 and/or reception component 1002, depicted in FIG. 10) may transmit or receive, based at least in part on the modification to the at least one of the configured grant or the SPS configuration, as described above. In some aspects, the modification is based at least in part on a change from a first time domain pattern to a second time domain pattern.

Process 800 may include additional aspects, such as any single aspect or any combination of aspects described below and/or in connection with one or more other processes described elsewhere herein.

In a first aspect, process 800 further includes transmitting (e.g., using transmission component 1004), to the UE, an instruction to switch from the first time domain pattern to the second time domain pattern.

In a second aspect, alone or in combination with the first aspect, process 800 further includes receiving (e.g., using reception component 1002), from the UE, an indication that the UE has switched from the first time domain pattern to the second time domain pattern.

In a third aspect, alone or in combination with one or more of the first and second aspects, the at least one of the configured grant or the SPS configuration is associated with the first time domain pattern, and the modification includes a switch to at least one of an additional configured grant or an additional SPS configuration, associated with the second time domain pattern.

In a fourth aspect, alone or in combination with one or more of the first through third aspects, process 800 further includes transmitting (e.g., using transmission component 1004), to the UE, an indication of the modification.

In a fifth aspect, alone or in combination with one or more of the first through fourth aspects, the modification includes a frequency domain offset, a time domain offset, an MCS offset, or a combination thereof.

In a sixth aspect, alone or in combination with one or more of the first through fifth aspects, the modification is based at least in part on at least one rule stored in the memory of the base station.

In a seventh aspect, alone or in combination with one or more of the first through sixth aspects, the at least one rule indicates that an uplink transmission, scheduled in a slot that was an uplink slot in the first time domain pattern and is a downlink slot in the second time domain pattern, is offset to a subsequent slot that is an uplink slot in the second time domain pattern.

In an eighth aspect, alone or in combination with one or more of the first through seventh aspects, the at least one rule indicates that a downlink transmission, scheduled in a slot that was a downlink slot in the first time domain pattern and is an uplink slot in the second time domain pattern, is offset to a subsequent slot that is a downlink slot in the second time domain pattern.

In a ninth aspect, alone or in combination with one or more of the first through eighth aspects, the at least one rule indicates that an uplink transmission, scheduled in a slot that was an uplink slot in the first time domain pattern and is a full duplex slot in the second time domain pattern, is received using a configuration associated with a full duplex mode of the base station.

In a tenth aspect, alone or in combination with one or more of the first through ninth aspects, the at least one rule indicates that a downlink transmission, scheduled in a slot that was a downlink slot in the first time domain pattern and is a full duplex slot in the second time domain pattern, is transmitted using a configuration associated with a full duplex mode of the base station.

In an eleventh aspect, alone or in combination with one or more of the first through tenth aspects, process 800 further includes transmitting (e.g., using transmission component 1004), to the UE, an activation associated with the Type 1 configured grant, and the modification is applied based at least in part on the activation.

In a twelfth aspect, alone or in combination with one or more of the first through eleventh aspects, process 800 further includes refraining from receiving (e.g., using reception component 1002) using the Type 1 configured grant based at least in part on the change from the first time domain pattern to the second time domain pattern.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
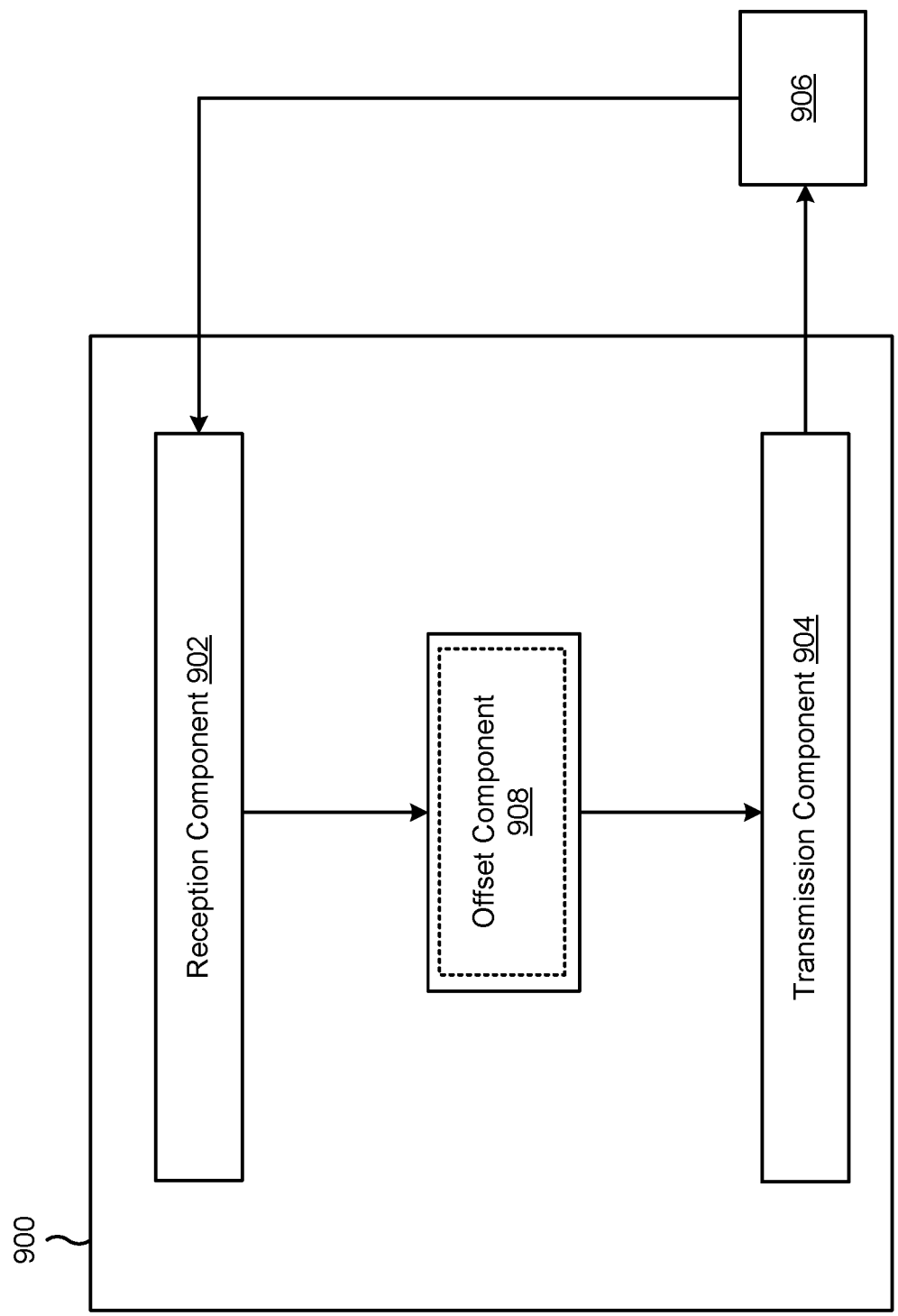
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include an offset component 908, among other examples.

In some aspects, the apparatus 900 may be configured to perform one or more operations described herein in connection with FIGS. 6A-6B. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

In some aspects, the reception component 902 may receive, from the apparatus 906, an indication of at least one of a configured grant or an SPS configuration. Accordingly, the transmission component 904 may transmit (e.g., to the apparatus 906) and/or the reception component 902 may receive (e.g., from the apparatus 906), based at least in part on a modification to the at least one of the configured grant or the SPS configuration. In some aspects, the modification is based at least in part on a change from a first time domain pattern to a second time domain pattern.

The reception component 902 may receive, from the apparatus 906, an indication of the modification. As an alternative, the offset component 908 may determine the modification. For example, the offset component 908 may store at least one rule used to determine the modification. In some aspects, the offset component 908 may include a MIMO detector, a receive processor, a transmit MIMO processor, a transmit processor, a controller/processor, a memory, or a combination thereof, of the UE described above in connection with FIG. 2.

In some aspects, the reception component 902 may receive, from the apparatus 906, an instruction to switch from the first time domain pattern to the second time domain pattern. Additionally, or alternatively, the transmission component 904 may transmit, to the apparatus 906, an indication that the apparatus 900 has switched from the first time domain pattern to the second time domain pattern.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
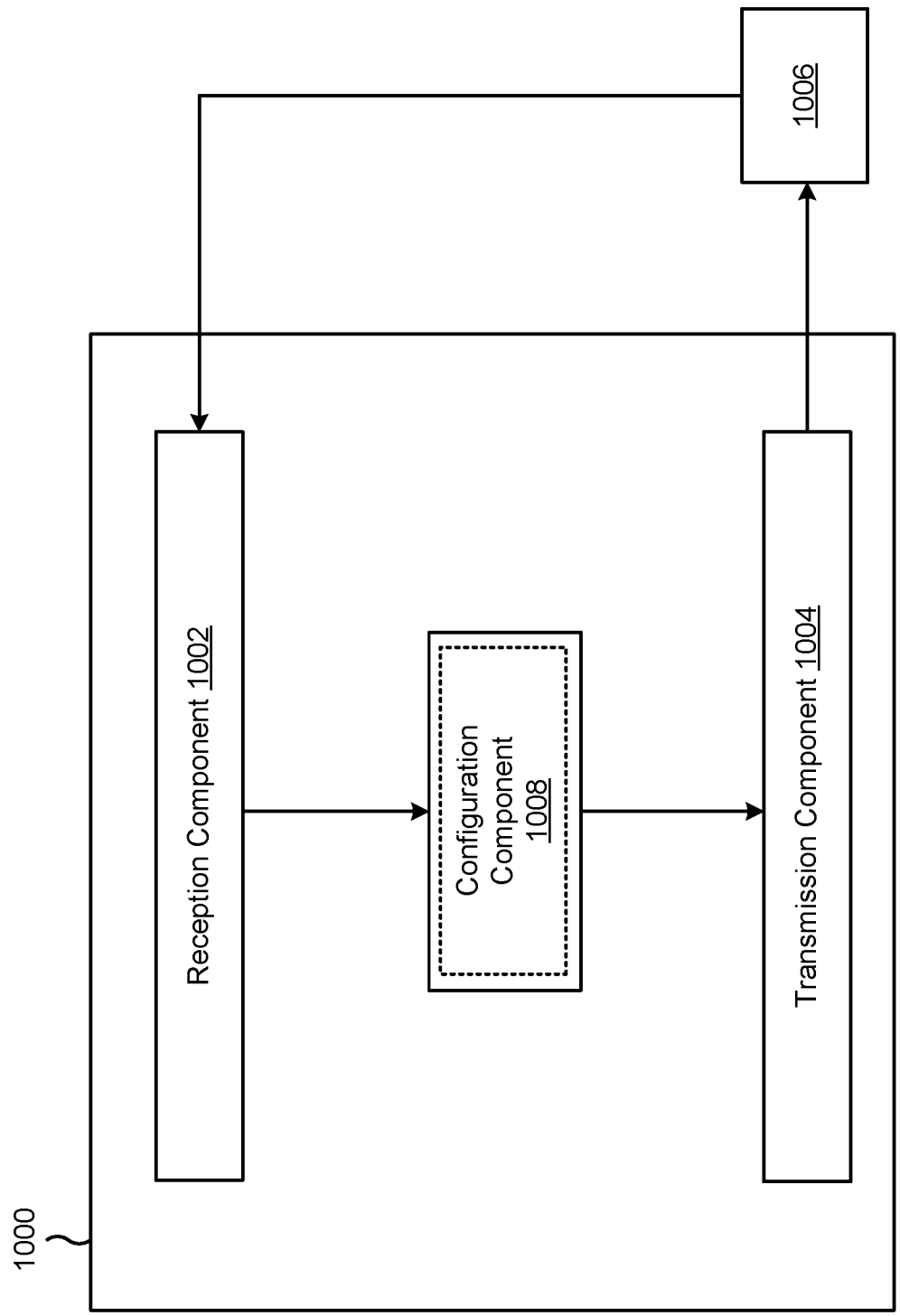

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a configuration component 1008, among other examples.

In some aspects, the apparatus 1000 may be configured to perform one or more operations described herein in connection with FIGS. 6A-6B. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

In some aspects, the transmission component 1004 may transmit, to the apparatus 1006, an indication of at least one of a configured grant or an SPS configuration. Accordingly, the transmission component 1004 may transmit (e.g., to the apparatus 1006) and/or the reception component 1002 may receive (e.g., from the apparatus 1006), based at least in part on a modification to the at least one of the configured grant or the SPS configuration. In some aspects, the modification is based at least in part on a change from a first time domain pattern to a second time domain pattern.

The transmission component 1004 may transmit, to the apparatus 1006, an indication of the modification. For example, the configuration component 1008 may determine the modification (e.g., using at least one rule and/or based at least in part on channel conditions with the apparatus 1006).

In some aspects, the configuration component 1008 may include a MIMO detector, a receive processor, a transmit MIMO processor, a transmit processor, a controller/processor, a memory, or a combination thereof, of the base station described above in connection with FIG. 2.

In some aspects, the transmission component 1004 may transmit, to the apparatus 1006, an instruction to switch from the first time domain pattern to the second time domain pattern. Additionally, or alternatively, the reception component 1002 may receive, from the apparatus 1006, an indication that the apparatus 1006 has switched from the first time domain pattern to the second time domain pattern.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a base station, an indication of at least one of a configured grant or a semi-persistent scheduling (SPS) configuration; and transmitting or receiving, based at least in part on a modification to the at least one of the configured grant or the SPS configuration, wherein the modification is based at least in part on a change from a first time domain pattern to a second time domain pattern.

Aspect 2: The method of Aspect 1, further comprising: receiving, from the base station, an instruction to switch from the first time domain pattern to the second time domain pattern.

Aspect 3: The method of any one of Aspects 1 through 2, further comprising: transmitting, to the base station, an indication that the UE has switched from the first time domain pattern to the second time domain pattern.

Aspect 4: The method of any one of Aspects 1 through 3, wherein the at least one of the configured grant or the SPS configuration is associated with the first time domain pattern, and wherein the modification includes a switch to at least one of an additional configured grant or an additional SPS configuration, associated with the second time domain pattern.

Aspect 5: The method of any one of Aspects 1 through 3, wherein the modification includes a frequency domain offset, a time domain offset, a modulation and coding scheme offset, or a combination thereof.

Aspect 6: The method of any one of Aspects 1 through 5, further comprising: receiving, from the base station, an indication of the modification.

Aspect 7: The method of any one of Aspects 1 through 3, wherein the modification is based at least in part on at least one rule stored in a memory of the UE.

Aspect 8: The method of Aspect 7, wherein the at least one rule indicates that an uplink transmission, scheduled in a slot that was an uplink slot in the first time domain pattern and is a downlink slot in the second time domain pattern, is offset to a subsequent slot that is an uplink slot in the second time domain pattern.

Aspect 9: The method of any one of Aspects 7 through 8, wherein the at least one rule indicates that a downlink transmission, scheduled in a slot that was a downlink slot in the first time domain pattern and is an uplink slot in the second time domain pattern, is offset to a subsequent slot that is a downlink slot in the second time domain pattern.

Aspect 10: The method of any one of Aspects 7 through 9, wherein the at least one rule indicates that an uplink transmission, scheduled in a slot that was an uplink slot in the first time domain pattern and is a full duplex slot in the second time domain pattern, is transmitted using a configuration associated with a full duplex mode of the UE.

Aspect 11: The method of any one of Aspects 7 through 10, wherein the at least one rule indicates that a downlink transmission, scheduled in a slot that was a downlink slot in the first time domain pattern and is a full duplex slot in the second time domain pattern, is received using a configuration associated with a full duplex mode of the UE.

Aspect 12: The method of any one of Aspects 1 through 11, wherein the at least one of the configured grant or the SPS configuration includes a Type 1 configured grant, and the method further comprises: receiving, from the base station, an activation associated with the Type 1 configured grant, wherein the modification is applied based at least in part on the activation.

Aspect 13: The method of any one of Aspects 1 through 11, wherein the indication further includes a Type 1 configured grant, and wherein the method further comprises: refraining from transmitting using the Type 1 configured grant based at least in part on the change from the first time domain pattern to the second time domain pattern.

Aspect 14: A method of wireless communication performed by a base station, comprising: transmitting, to a user equipment (UE), an indication of at least one of a configured grant or a semi-persistent scheduling (SPS) configuration; and transmitting or receiving, based at least in part on a modification to the at least one of the configured grant or the SPS configuration, wherein the modification is based at least in part on a change from a first time domain pattern to a second time domain pattern.

Aspect 15: The method of Aspect 14, further comprising: transmitting, to the UE, an instruction to switch from the first time domain pattern to the second time domain pattern.

Aspect 16: The method of any one of Aspects 14 through 15, further comprising: receiving, from the UE, an indication that the UE has switched from the first time domain pattern to the second time domain pattern.

Aspect 17: The method of any one of Aspects 14 through 16, wherein the at least one of the configured grant or the SPS configuration is associated with the first time domain pattern, and wherein the modification includes a switch to at least one of an additional configured grant or an additional SPS configuration, associated with the second time domain pattern.

Aspect 18: The method of any one of Aspects 14 through 16, wherein the modification includes a frequency domain offset, a time domain offset, a modulation and coding scheme offset, or a combination thereof.

Aspect 19: The method of any one of Aspects 14 through 18, further comprising: transmitting, to the UE, an indication of the modification.

Aspect 20: The method of any one of Aspects 14 through 16, wherein the modification is based at least in part on at least one rule stored in a memory of the base station.

Aspect 21: The method of Aspect 20, wherein the at least one rule indicates that an uplink transmission, scheduled in a slot that was an uplink slot in the first time domain pattern and is a downlink slot in the second time domain pattern, is offset to a subsequent slot that is an uplink slot in the second time domain pattern.

Aspect 22: The method of any one of Aspects 20 through 21, wherein the at least one rule indicates that a downlink transmission, scheduled in a slot that was a downlink slot in the first time domain pattern and is an uplink slot in the second time domain pattern, is offset to a subsequent slot that is a downlink slot in the second time domain pattern.

Aspect 23: The method of any one of Aspects 20 through 22, wherein the at least one rule indicates that an uplink transmission, scheduled in a slot that was an uplink slot in the first time domain pattern and is a full duplex slot in the second time domain pattern, is received using a configuration associated with a full duplex mode of the base station.

Aspect 24: The method of any one of Aspects 20 through 23, wherein the at least one rule indicates that a downlink transmission, scheduled in a slot that was a downlink slot in the first time domain pattern and is a full duplex slot in the second time domain pattern, is transmitted using a configuration associated with a full duplex mode of the base station.

Aspect 25: The method of any one of Aspects 14 through 24, wherein the at least one of the configured grant or the SPS configuration includes a Type 1 configured grant, and wherein the method further comprises: transmitting, to the UE, an activation associated with the Type 1 configured grant, wherein the modification is applied based at least in part on the activation.

Aspect 26: The method of any one of Aspects 14 through 24, wherein the indication further includes a Type 1 configured grant, and wherein the method further comprises: refraining from receiving using the Type 1 configured grant based at least in part on the change from the first time domain pattern to the second time domain pattern.

Aspect 27: An apparatus for wireless communication at a device, comprising a processor; memory coupled with the processor; and instructions stored in the memory and executable by the processor to cause the apparatus to perform the method of one or more Aspects of Aspects 1-13.

Aspect 28: A device for wireless communication, comprising a memory and one or more processors coupled to the memory, the memory and the one or more processors configured to perform the method of one or more Aspects of Aspects 1-13.

Aspect 29: An apparatus for wireless communication, comprising at least one means for performing the method of one or more Aspects of Aspects 1-13.

Aspect 30: A non-transitory computer-readable medium storing code for wireless communication, the code comprising instructions executable by a processor to perform the method of one or more Aspects of Aspects 1-13.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 1-13.

Aspect 32: An apparatus for wireless communication at a device, comprising a processor; memory coupled with the processor; and instructions stored in the memory and executable by the processor to cause the apparatus to perform the method of one or more Aspects of Aspects 14-26.

Aspect 33: A device for wireless communication, comprising a memory and one or more processors coupled to the memory, the memory and the one or more processors configured to perform the method of one or more Aspects of Aspects 14-26.

Aspect 34: An apparatus for wireless communication, comprising at least one means for performing the method of one or more Aspects of Aspects 14-26.

Aspect 35: A non-transitory computer-readable medium storing code for wireless communication, the code comprising instructions executable by a processor to perform the method of one or more Aspects of Aspects 14-26.

Aspect 36: A non-transitory computer-readable medium storing a set of instructions for wireless communication, the set of instructions comprising one or more instructions that, when executed by one or more processors of a device, cause the device to perform the method of one or more Aspects of Aspects 14-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors coupled to the memory, the one or more processors configured to:
        receive, from a network entity, an indication of at least one of a configured grant or a semi-persistent scheduling (SPS) configuration, wherein the at least one of the configured grant or the SPS configuration comprises a first time division duplexing pattern; and
        transmit or receive, based at least in part on a modification to the at least one of the configured grant or the SPS configuration, wherein the modification is based at least in part on a change from the first time division duplexing pattern to a second time division duplexing pattern, wherein the modification includes a frequency domain duplexing type change, a time domain offset, a modulation and coding scheme offset, or a combination thereof.

2. The UE of claim 1, wherein the one or more processors are further configured to:
    receive, from the network entity, an instruction to switch from the first time division duplexing pattern to the second time division duplexing pattern.

3. The UE of claim 1, wherein the one or more processors are further configured to:
    transmit, to the network entity, an indication that the UE has switched from the first time division duplexing pattern to the second time division duplexing pattern.

4. The UE of claim 1, wherein the at least one of the configured grant or the SPS configuration is associated with the first time division duplexing pattern, and wherein the modification includes a switch to at least one of an additional configured grant or an additional SPS configuration, associated with the second time division duplexing pattern.

5. The UE of claim 1, wherein the one or more processors are further configured to:
    receive, from the network entity, an indication of the modification.

6. The UE of claim 1, wherein the modification is based at least in part on at least one rule stored in the memory of the UE.

7. The UE of claim 6, wherein the modification includes the time domain offset, and the at least one rule indicates that an uplink transmission, scheduled in a slot that was an uplink slot in the first time division duplexing pattern and is a downlink slot in the second time division duplexing pattern, is offset to a subsequent slot that is an uplink slot in the second time division duplexing pattern.

8. The UE of claim 6, wherein the modification includes the time domain offset, and the at least one rule indicates that a downlink transmission, scheduled in a slot that was a downlink slot in the first time division duplexing pattern and is an uplink slot in the second time division duplexing pattern, is offset to a subsequent slot that is a downlink slot in the second time division duplexing pattern.

9. The UE of claim 6, wherein the modification includes the frequency domain duplexing type change, and the at least one rule indicates that an uplink transmission, scheduled in a slot that was an uplink slot in the first time division duplexing pattern and is a full duplex slot in the second time division duplexing pattern, is transmitted using a configuration associated with a full duplex mode of the UE.

10. The UE of claim 6, wherein the modification includes the frequency domain duplexing type change, and the at least one rule indicates that a downlink transmission, scheduled in a slot that was a downlink slot in the first time division duplexing pattern and is a full duplex slot in the second time division duplexing pattern, is received using a configuration associated with a full duplex mode of the UE.

11. The UE of claim 1, wherein the at least one of the configured grant or the SPS configuration includes a Type 1 configured grant, and wherein the one or more processors are further configured to:
receive, from the network entity, an activation associated with the Type 1 configured grant,
wherein the modification is applied based at least in part on the activation.

12. The UE of claim 1, wherein the indication further includes a Type 1 configured grant, and wherein the one or more processors are further configured to:
refrain from transmitting using the Type 1 configured grant based at least in part on the change from the first time division duplexing pattern to the second time division duplexing pattern.

13. A network entity for wireless communication, comprising:
a memory; and
one or more processors coupled to the memory, the one or more processors configured to:
transmit, to a user equipment (UE), an indication of at least one of a configured grant or a semi-persistent scheduling (SPS) configuration, wherein the at least one of the configured grant or the SPS configuration comprises a first time division duplexing pattern; and
transmit or receive, based at least in part on a modification to the at least one of the configured grant or the SPS configuration, wherein the modification is based at least in part on a change from the first time division duplexing pattern to a second time division duplexing pattern, wherein the modification includes a frequency domain duplexing type change, a time domain offset, a modulation and coding scheme offset, or a combination thereof.

14. The network entity of claim 13, wherein the one or more processors are further configured to:
transmit, to the UE, an instruction to switch from the first time division duplexing pattern to the second time division duplexing pattern.

15. The network entity of claim 13, wherein the one or more processors are further configured to:
receive, from the UE, an indication that the UE has switched from the first time division duplexing pattern to the second time division duplexing pattern.

16. The network entity of claim 13, wherein the at least one of the configured grant or the SPS configuration is associated with the first time division duplexing pattern, and wherein the modification includes a switch to at least one of an additional configured grant or an additional SPS configuration, associated with the second time division duplexing pattern.

17. The network entity of claim 13, wherein the one or more processors are further configured to:
transmit, to the UE, an indication of the modification.

18. The network entity of claim 13, wherein the modification is based at least in part on at least one rule stored in the memory of the network entity.

19. The network entity of claim 18, wherein the modification includes the time domain offset, and the at least one rule indicates that an uplink transmission, scheduled in a slot that was an uplink slot in the first time division duplexing pattern and is a downlink slot in the second time division duplexing pattern, is offset to a subsequent slot that is an uplink slot in the second time division duplexing pattern.

20. The network entity of claim 18, wherein the modification includes the time domain offset, and the at least one rule indicates that a downlink transmission, scheduled in a slot that was a downlink slot in the first time division duplexing pattern and is an uplink slot in the second time division duplexing pattern, is offset to a subsequent slot that is a downlink slot in the second time division duplexing pattern.

21. The network entity of claim 18, wherein the modification includes the frequency domain duplexing type change, and the at least one rule indicates that an uplink transmission, scheduled in a slot that was an uplink slot in the first time division duplexing pattern and is a full duplex slot in the second time division duplexing pattern, is received using a configuration associated with a full duplex mode of the network entity.

22. The network entity of claim 18, wherein the modification includes the frequency domain duplexing type change, and the at least one rule indicates that a downlink transmission, scheduled in a slot that was a downlink slot in the first time division duplexing pattern and is a full duplex slot in the second time division duplexing pattern, is transmitted using a configuration associated with a full duplex mode of the network entity.

23. The network entity of claim 13, wherein the at least one of the configured grant or the SPS configuration includes a Type 1 configured grant, and wherein the one or more processors are further configured to:
transmit, to the UE, an activation associated with the Type 1 configured grant,
wherein the modification is applied based at least in part on the activation.

24. The network entity of claim 13, wherein the indication further includes a Type 1 configured grant, and wherein the one or more processors are further configured to:
refrain from receiving using the Type 1 configured grant based at least in part on the change from the first time division duplexing pattern to the second time division duplexing pattern.

25. A method of wireless communication performed by a user equipment (UE), comprising:
receiving, from a network entity, an indication of at least one of a configured grant or a semi-persistent scheduling (SPS) configuration, wherein the at least one of the configured grant or the SPS configuration comprises a first time division duplexing pattern; and
transmitting or receiving, based at least in part on a modification to the at least one of the configured grant or the SPS configuration, wherein the modification is based at least in part on a change from the first time division duplexing pattern to a second time division duplexing pattern, wherein the modification includes a frequency domain duplexing type change, a time domain offset, a modulation and coding scheme offset, or a combination thereof.

26. The method of claim 25, wherein the at least one of the configured grant or the SPS configuration includes a Type 1 configured grant, and wherein the method further comprises:
receiving, from the network entity, an activation associated with the Type 1 configured grant, wherein the modification is applied based at least in part on the activation.

27. The method of claim 25, wherein the indication further includes a Type 1 configured grant, and wherein the method further comprises:
refraining from transmitting using the Type 1 configured grant based at least in part on the change from the first time division duplexing pattern to the second time division duplexing pattern.

28. A method of wireless communication performed by a network entity, comprising:
transmitting, to a user equipment (UE), an indication of at least one of a configured grant or a semi-persistent scheduling (SPS) configuration, wherein the at least one of the configured grant or the SPS configuration comprises a first time division duplexing pattern; and
transmitting or receiving, based at least in part on a modification to the at least one of the configured grant or the SPS configuration, wherein the modification is based at least in part on a change from the first time division duplexing pattern to a second time division duplexing pattern, wherein the modification includes a frequency domain duplexing type change, a time domain offset, a modulation and coding scheme offset, or a combination thereof.

29. The UE of claim 5, wherein the frequency domain duplexing type change comprises a change from a half duplex slot or a paired band full-duplex slot to a sub-band full duplex slot.

30. The network entity of claim 17, wherein the frequency domain duplexing type change comprises a change from a half duplex slot or a paired band full-duplex slot to a sub-band full duplex slot.

\* \* \* \* \*